March 5, 1963
R. C. TENTEN
3,080,537
DELAY APPARATUS USING ACOUSTIC LINE WITH MAGNETOSTRICTIVE
INPUT AND MAGNETORESISTIVE OUTPUT
Filed Oct. 2, 1959
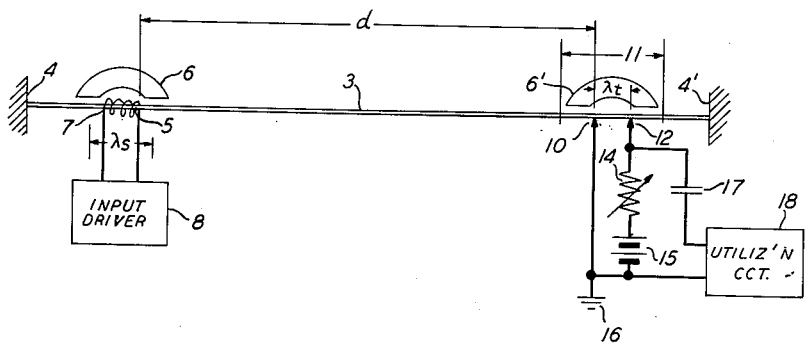
INVENTOR
R. C. TENTEN
BY
R. C. Winter
ATTORNEY

3,080,537
DELAY APPARATUS USING ACOUSTIC LINE WITH MAGNETOSTRICTIVE INPUT AND MAGNETORESISTIVE OUTPUT
Robert C. Tenten, Jersey City, N.J., assignor to Bell Telephone Laboratories, Incorporated, New York, N.Y., a corporation of New York
Filed Oct. 2, 1959, Ser. No. 843,956
11 Claims. (Cl. 333—30)

This invention relates to magnetostrictive and elastoresistive apparatus and more particularly to such apparatus employed for the production and utilization of ultrasonic impulses.

The generation of ultrasonic strain impulses for use in signal transmission members is an operation characteristic of many digital data systems. Electrical signals derived in one portion of such systems are applied to a transducing device to launch the acoustic impulses, and, at one or more predetermined distances from the launching point, the strain impulses are converted to corresponding electrical signals by the use of similar transducing apparatus.

In the prior art, both transducing functions are accomplished by the utilization of the magnetostrictive properties of the impulse transmission member. For operation in the longitudinal mode, the input transducer in these prior art devices comprises an electrically energized solenoid coaxial with the magnetostrictive impulse transmission member and a biasing magnet for producing a longitudinal field in that portion of the member surrounded by the solenoid.

The output transducer comprises a similar solenoid and biasing magnet to develop an E.M.F. across the ends of the solenoid when the strain impulse arrives to modify the permeability of the magnetostrictive material under the solenoid. The change in permeability modifies the biasing flux linking the solenoid, and the change in flux, in accordance with Faraday's law, develops an E.M.F. in the solenoid. The use of such solenoids at the high pulse repetition frequencies required in many electrical systems tends to become a critical factor in maintaining optimum flux coupling with the increasingly small diameter transmission elements which are needed to maximize flux penetration and to keep down eddy current losses.

In addition to the above-mentioned characteristics of the prior art solenoid-type output transducers, it will be observed that the amplitude of their electrical response is not readily adjustable. Thus, for a given amplitude strain impulses, a change in induced E.M.F. may only be obtained by resorting to a solenoid having a different number of turns or to a magnetostrictive material exhibiting a different time rate of flux swing, or, more particularly, a material having a different strain sensitivity. While effects similar to the latter may be partially obtained by using an electromagnet to provide a variable polarizing magnetic field at the output, it has been observed in commonly used magnetostrictive materials, for example, 45 Permalloy, that the strain sensitivity decreases after the polarizing induction is increased beyond about half the saturation value. (See, for example, "Ferromagnetism" by Bozorth, D. Van Nostrand Co., New York, 1951, Figs. 13–32.) Since the polarizing field would normally be adjusted for most efficient operation, i.e., at the half-saturation level, no increase in output amplitude could be obtained by an increase (or decrease) in bias field strength. To obtain adjustable response, it is therefore necessary to operate at a less efficient point on the strain sensitivity characteristic.

The elimination of at least one of the expensive solenoids used in the transducing apparatus of the prior art would reduce cost and simplify construction of ultrasonic delay lines and similar signal transmission devices. One approach to the elimination of the output transducer winding is demonstrated in the copending application of T. R. Long, Serial No. 724,389, filed March 27, 1958. This invention utilizes a torsional mode of impulse transmission and detects the ultrasonic impulses by a voltage induced in the transmission member rather than by a voltage induced in a solenoid. The voltage is induced by the changes in circumferential flux components effected by the torsional impulse, and the amplitude of the voltage is approximately proportional to the time derivative of this flux change. While the delay line thereby achieved is suitable for many system applications, it may be desirable in other applications to employ a delay line operating in the more conventional longitudinal mode of impulse transmission.

Accordingly, it is an object of the present invention to provide a simple and efficient means for converting mechanical strain impulses into corresponding electrical signals.

It is another object of the present invention to provide an improved output transducer for longitudinal mode ultrasonic delay lines.

It is a further object of the present invention to provide an electromechanical transduction device having a readily adjustable amplitude response.

The foregoing objects are realized in accordance with the principles of this invention wherein a longitudinal strain impulse is detected by applying a polarizing magnetic field and a predetermined biasing current to a portion of an ultrasonic transmission member exhibiting ferromagnetic properties at least in that portion and by sensing the variation in biasing current caused by the presence of the strain impulse in such portion. The ultrasonic impulse modifies the quiescent stress established in the member and reacts with the polarizing magnetic field to produce a transient variation in the resistivity of the current-carrying ferromagnetic portion. The variation in resistivity effects a corresponding change in resistance to produce a modulation of the biasing current which serves to indicate the presence of the ultrasonic impulse. For a given amplitude strain impulse, the amplitude of transient voltage response developed is adjustable in accordance with the level of D.C. bias current selected, the same percentage change in resistance producing larger increments of voltage for larger biasing currents.

It is a feature of this invention that a mechanical strain impulse modulate a current-carrying portion of the impulse transmission member to indicate the presence of the impulse therein.

It is another feature of this invention that the application of a strain impulse and a bias current to a distinct portion of a polarized ferromagnetic member permit a selective adjustment of the transient voltage developed in such portion.

It is another feature of this invention that the selective adjustment of a bias current in a quiescently stressed elasto-resistive segment of an ultrasonic transmission member effect a corresponding adjustment in the amplitude of electrical pulse obtained from the segment.

It is still another feature of this invention that the duration of signals responsive to the presence of a given wavelength ultrasonic impulse be determined by a current-carrying segment of a portion of the transmission member subjected to a longitudinal polarizing field.

The foregoing and other objects and features of the present invention may be more readily understood from the following detailed description and drawing, the single FIGURE of which depicts an ultrasonic delay line having the improved output transducing means of this invention.

Referring now to the drawing, there is shown an ultrasonic delay line apparatus comprising an ultrasonic impulse transmission member 3 spanning reflection-suppressing supports 4 and 4'. The input portion 5 of the transmission member is advantageously of ferromagnetic material and is arranged for operation in the longitudinal mode of impulse propagation by biasing magnet 6 and input solenoid 7. The magnitude of biasing field and the quiescent stress in portion 5 are adjusted so that the material comprising portion 5 will exhibit optimum magnetostrictive properties. For many of the commonly used magnetostrictive materials, the longitudinal pulse magnetostriction is enhanced by a given quiescent (tensile) stress when the magnetic bias applied by magnet 6 is such as to place the material comprising the portion 5 at, or just past, the knee of its hysteresis characteristic. For use at moderate and high pulse repetition rates, input solenoid 7 is closely coupled to portion 5 which is of small cross-section to reduce eddy current losses and flux penetration time. The effective axial length $\lambda_s$ of solenoid 7 is advantageously kept short to provide a correspondingly short wavelength in the transmitted strain impulse. Since the flux produced by a solenoid will extend somewhat beyond the physical length of the winding, the winding length must be accurately controlled to achieve the desired effective length $\lambda_s$. Solenoid 7 may be either a single or a multilayer winding.

Input driving source 8 provides an electrical current to energize solenoid 7, and, depending upon the sign of the magnetostrictive coefficient of the material comprising the portion 5, either a compressive or distensive stress will be set up when solenoid 7 is energized. Assuming the material to have a positive magnetostrictive coefficient, the stress will be distensive within portion 5 thereby causing a compressive strain impulse to be launched at each end of solenoid 7. The compressive impulse launched at the left end of solenoid 7 travels to the left and is absorbed by the reflection-suppressing support 4. The compressive impulse launched at the right end of solenoid 7 travels toward the output transducing apparatus located at the right-hand end of the member 3. The distance $d$ between the input solenoid 7 and electrical connection 10 of the output transducing apparatus determines the delay obtained by the over-all device. For an impulse transmission member 3 in the form of a wire drawn from any of the commonly used ferromagnetic materials, the delay is about 5 microseconds per inch.

At the right-hand end of transmission member 3, a magnet 6' is positioned to produce a polarizing magnetic field in the portion 11 of member 3. The over-all length of the polarizing field is not critical and advantageously may overlap the distance $\lambda_t$ between electrical connection 10 and electrical connection 12. The quiescent stress and the intensity of the polarizing field in portion 11 is adjusted to maximize the change in resistivity of portion 11 for the given amplitude of strain impulse launched in member 3 by the input solenoid 7. Because many of the ferromagnetic materials which exhibit magnetostriction also exhibit a corresponding change in resistivity under similar conditions, a homogeneous transmission member may be employed. In this case, the quiescent stress in portions 5 and 11 will be substantially equal and the polarizing magnetic intensity due to magnets 6 and 6' should be adjusted to maximize, respectively, the percentage strain per unit induction and the per unit variation of resistivity with propagated strain. Adjustment of quiescent stress in member 3 is readily accomplished by varying the separation of supports 4 and 4'. Adjustment of the polarizing magnetic intensities is readily accomplished by adjusting the distances between the poles of each of magnets 6 and 6' and the corresponding portions 5 and 11 of member 3.

A bias current source, such as bias battery 15 and rheostat 14, is serially connected between electrical connection 12 and common ground 16 so that a unidirectional bias current of predetermined magnitude is sent only through the length $\lambda_t$ of output portion 11. Electrical connection 10 is connected to common ground 16 to provide the return path to battery 15 for the current in the length $\lambda_t$. The bias current also may be provided by a clock pulse generator in which case the biasing operation advantageously is combined with an output sampling operation.

The above-mentioned rightward traveling compressional impulse will interact with the polarizing field from magnet 6' and the quiescent stress in member 3 to effect a variation in the resistivity of portion 11. However, only during the time that the impulse traverses the length $\lambda_t$ will this variation in resistivity affect the current established by rheostat 14 and battery 15. Accordingly, there is provided a convenient degree of control over the duration of voltage variation in that this duration may be determined by the more easily controlled distance $\lambda_t$ between connections 10 and 12 rather than by the less easily controlled length 11 of polarizing field produced by magnet 6'. Electrical connections 10 and 12 must, of course, not unduly attenuate the strain impulse being propagated in member 3. Suitable connections may be effected by means of knife-edge contacts or by welding a fine resilient wire to member 3. Where member 3 is itself a fine diameter wire, the well-known welding techniques developed in the construction of vacuum tube grids may be employed to advantage.

The voltage developed by the bias current in the length $\lambda_t$ undergoes a variation due to the strain impulse and this voltage variation is advantageously coupled by capacitor 17 to utilization circuit 18. While the percent variation in voltage effected by a given magnitude strain impulse is independent of the bias current level, an increase in the bias current will, of course, result in a larger voltage change than that obtained with a lower value bias current. Since capacitor 17 blocks the quiescent bias current from utilization circuit 18, only the changes in potential due to the strain impulse are delivered to circuit 18 and the magnitude of these voltage changes is controllable by adjustment of rheostat 14. Thus a controllable magnitude output may be obtained without the need to alter the values of polarizing field and stress which yield optimum conversion of strain impulses to resistivity variation.

While the operation of the device has been thus far described in terms of the compressional impulse launched by the energization of solenoid 7, the de-energization of solenoid 7, which launches a rarefractional impulse, effects a similar operation, though opposite in sense to that effected by energization of solenoid 7. Thus, for a transmission member 3 having a magnetostrictive coefficient such that a compressional pulse effected by energization of solenoid 7 produces a transient increase in resistivity in length $\lambda_t$, the rarefactional impulse, launched by the de-energization of solenoid 7, produces a transient decrease in resistivity in length $\lambda_t$. Advantageously the interval between energization and de-energization of solenoid 7 may be adjusted so that the respective transient changes follow each other to produce an additive transient resistivity variation thereby increasing the transient signal coupled to circuit 18.

In one experimental embodiment illustrative of the principles of this invention, a .001 inch diameter vanadium Supermendur wire under a few grams of quiescent tension was used for member 3. The length $\lambda_t$ between knife-edge type connections 10 and 12 was approximately ⅛ inch and a direct current of 200 milliamperes established. The quiescent voltage drop was 500 millivolts and the transient variation due to the presence of a maximum amplitude strain impulse launched by the conventional input solenoid 7, was about 5 millivolts.

It is to be understood that numerous other arrangements and modifications, as well as other applications, may be devised by one skilled in the art without departing from the spirit and scope of this invention.

What is claimed is:

1. A signal delay apparatus comprising an elongated magnetostrictive member, means coupled to one end of said member for launching longitudinal strain impulses therein, and output means responsive to said strain impulses including means for applying a longitudinal magnetic field to a segment of said member remote from said one end, means for applying an electrical current to at least a portion of said segment, and sensing means coupled to said electrical current applying means for responding directly to the change in said current contemporaneously accompanying said impulses as they are propagated through said segment.

2. A signal delay apparatus in accordance with claim 1 wherein said means for applying said current includes a pair of conductors resiliently connected to said portion.

3. A signal delay apparatus in accordance with claim 2 wherein said means for applying said current comprises a unidirectional current source connected between said conductors.

4. A signal delay apparatus in accordance with claim 3 wherein said means for applying said current includes means for selectively adjusting said current source.

5. A signal delay apparatus comprising a source of electrical signals to be delayed, a longitudinally disposed strain impulse transmission element, input transducing means for generating strain impulses in said element corresponding to said electrical signals, and output transducing means for generating electrical variations corresponding to said strain impulses after a delay proportional to the length of said element between the respective transducing means, said output means including an electrically conductive segment of said element, means for tensioning said segment, means for applying a magnetic field to modify the quiescent longitudinal resistivity of said segment, means for applying an electrical current to said segment, and means responsive to the variations in said electrical current produced by said strain impulses passing through said segment.

6. A signal delay apparatus in accordance with claim 5 wherein said means responsive to said variations includes an output circuit and a capacitor coupled to said segment for blocking the quiescent value of said electrical current from said output circuit.

7. In an ultrasonic delay line, the combination comprising an elongated, high resistivity ferromagnetic member, means for establishing a quiescent mechanical stress in said member, and means for selectively detecting variations in said stress including flux source means for inducing a quiescent magnetic field collinear with said stress in a predetermined portion of said member, current source means connected to said member at distinct spaced-apart positions in said predetermined portion for causing a preset quiescent unidirectional voltage drop between said positions, and output circuit means including a capacitor connected across said portion of said member for detecting variations in said preset voltage drop resulting from said stress variations.

8. In an ultrasonic delay line according to claim 7, the combination wherein said current source includes a rheostat for regulating said preset voltage drop and wherein said output circuit means including said capacitor is connected across said rheostat.

9. An electrical circuit comprising an ultrasonic signal transmission member exhibiting longitudinal elastoresistance, means for launching pulse signals of a given length in said member, and means for retrieving from said member pulse signals at least as long as said given length including means for conductively applying a bias current to a portion of said member proportional to said desired length, means for applying a longitudinal magnetic field to at least said desired length of said member, and output means responsive to the decrease in said bias current during the passage of said pulse signal through said length of said member.

10. An ultrasonic delay line comprising a strain impulse transmitting member having at least one ferromagnetic portion, means for applying a polarizing magnetic field to said portion, means for generating strain impulses in said member, and means for detecting the change of resistance of said portion due to the occurrence thereat of said strain impulses, said detecting means including means for applying a bias current to only said portion of said impulse transmitting member and means for detecting variations in said bias current produced by said change of resistance.

11. In an ultrasonic delay line, an output transducer comprising an electrically conductive ferromagnetic portion of said delay line capable of having ultrasonic impulses propagated therethrough, means for magnetically biasing said portion, and means for observing the change in resistivity of said portion incident to the passage therethrough of each of said ultrasonic impulses, said observing means including means for applying a current to said delay line portion, and means responsive to the change in current in said portion produced during said change in resistivity.

References Cited in the file of this patent

UNITED STATES PATENTS

| | | |
|---|---|---|
| 2,736,824 | Robert | Feb. 28, 1956 |
| 2,854,593 | Hobrough | Sept. 20, 1958 |
| 3,016,498 | Powell | Jan. 9, 1962 |

FOREIGN PATENTS

| | | |
|---|---|---|
| 781,902 | Great Britain | Aug. 28, 1957 |
| 813,591 | Great Britain | May 21, 1959 |

OTHER REFERENCES

Bradburd: "Electrical Communication," vol. 28, No. 1, pages 46–53, March 1951.

Bozorth: "Physical Review," vol. 70, Nos. 11 and 12, Dec. 1 and 15, 1946, pages 923–932.